(12) United States Patent
Seo et al.

(10) Patent No.: US 8,619,663 B2
(45) Date of Patent: Dec. 31, 2013

(54) APPARATUS AND METHOD FOR COOPERATIVELY TRANSMITTING DOWNLINK BETWEEN BASE STATION AND RELAY STATION

(75) Inventors: Han-Byul Seo, Gyeonggi-Do (KR); Young-Seob Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 13/145,553

(22) PCT Filed: Jan. 21, 2010

(86) PCT No.: PCT/KR2010/000399
§ 371 (c)(1),
(2), (4) Date: Aug. 11, 2011

(87) PCT Pub. No.: WO2010/085103
PCT Pub. Date: Jul. 29, 2010

(65) Prior Publication Data
US 2012/0106433 A1    May 3, 2012

Related U.S. Application Data

(60) Provisional application No. 61/146,648, filed on Jan. 22, 2009.

(51) Int. Cl.
*H04B 7/005* (2006.01)
*H04B 7/14* (2006.01)
*H04L 12/28* (2006.01)
*H04J 1/10* (2006.01)

(52) U.S. Cl.
USPC ............ 370/315; 370/278; 370/394; 370/492

(58) Field of Classification Search
USPC ........................................................ 370/315
See application file for complete search history.

(56) References Cited

U.S. PATENT DOCUMENTS

| | | | | |
|---|---|---|---|---|
| 5,406,569 A | * | 4/1995 | Isozaki | 714/775 |
| 8,098,601 B2 | * | 1/2012 | Cai et al. | 370/276 |
| 2004/0218683 A1 | * | 11/2004 | Batra et al. | 375/261 |
| 2008/0175183 A1 | | 7/2008 | Devroye et al. | |
| 2008/0274692 A1 | | 11/2008 | Larsson | |
| 2009/0175214 A1 | * | 7/2009 | Sfar et al. | 370/315 |
| 2010/0080323 A1 | * | 4/2010 | Mueck et al. | 375/296 |

* cited by examiner

*Primary Examiner* — Steven H Nguyen
*Assistant Examiner* — Abu-Sayeed Haque
(74) *Attorney, Agent, or Firm* — Lee, Hong, Degerman, Kang & Waimey

(57) ABSTRACT

The present invention relates to an apparatus and method for cooperatively transmitting a downlink between a base station and a relay station. According to one embodiment of the present invention, a method for cooperatively transmitting a downlink signal between a base station and a relay station in a wireless broadband communication system comprises the steps of: receiving cooperative transmission data from the base station and transmitting an acknowledgement message corresponding to the cooperative transmission data to the base station; receiving scheduling information for transmitting the cooperative transmission data by a cooperative transmission scheme; and transmitting the data cooperative transmission data to a terminal in reference to the scheduling information.

7 Claims, 15 Drawing Sheets

APPARATUS AND METHOD FOR COOPERATIVELY TRANSMITTING DOWNLINK BETWEEN BASE STATION AND RELAY STATION

This application is the National Stage filing under 35 U.S.C. 371 of International Application No. PCT/KR2010/000399, filed on Jan. 21, 2010, which claims the benefit of U.S. Provisional Application Ser. No. 61/146,648, filed on Jan. 22, 2009, the contents of which are all incorporated by reference herein in their entirety.

TECHNICAL FIELD

The present invention relates to a wireless communication system using a relay station, and more particularly, to an apparatus and method for cooperatively transmitting a downlink signal to a terminal by a base station and a relay station.

BACKGROUND ART

In the next generation wireless communications system, a relay station (RS) is being introduced so as to increase cell coverage and to enhance a data transmission rate.

In the conventional wireless communications system using a relay station, there are not only wireless resources which consist of time or a frequency between a base station (BS) and a mobile station (MS), but also wireless resources between BS-RS, and wireless resources between RS-MS. Since a signal between BS-RS may be different from a signal between RS-MS, interference may occur when using the same wireless resources. This may lower the performance. In order to prevent this, has been considered a cooperative silencing technique in which the base station transmits no signal when the relay station transmits data.

However, the cooperative silencing technique may have the following problems. Firstly, since the BS is in an idle state using no wireless resources at a transmission section between the RS and the MS, a resource loss may occur. In order to solve this, the BS may also transmit a signal to the MS in a link between the BS and the MS by using the same wireless resources as wireless resources used for a transmission between the RS and the MS. This may enhance a receiving performance through a diversity effect. For instance, an antenna between the BS and the RS may be used to implement one space time coding.

In order to apply the above technique, required is scheduling information corresponding to data to be transmitted by the RS. In a cooperative transmission scheme between the BS and the RS, cooperative transmission data transmitted to the RS from the BS has to be successfully delivered.

However, in a substantial communication environment, the RS may not successfully receive cooperative transmission data transmitted from the BS. [7] In spite of this problem, the conventional art has proposed no method for preventing a transmission error in a link between the BS and the RS.

Since there is no consideration about a transmission error in a link between the BS and the RS in the conventional art, when the RS has not successfully received data transmitted from the BS, wireless resources pre-allocated so as to be transmitted to the MS may be wasted. Furthermore, since the BS and the RS do not perform an effective cooperative transmission, transmission efficiency to the MS may be lowered and long time delay may occur.

DISCLOSURE OF THE INVENTION

Therefore, an object of the present invention is to provide an apparatus and method for cooperatively transmitting a downlink between a base station and a relay station, by transmitting scheduling information to the relay station from the base station even if a transmission error has occurred in a link between the base station and the relay station.

To achieve these and other advantages and in accordance with the purpose of the present invention, as embodied and broadly described herein, there is provided a method for cooperatively transmitting a downlink between a base station and a relay station, the method comprising: receiving cooperative transmission data from the base station, and transmitting an acknowledgement message with respect to the cooperative transmission data to the base station; receiving, from the base station, scheduling information for a cooperative transmission of the cooperative transmission data; and transmitting the cooperative transmission data to a terminal with reference to the scheduling information.

Preferably, the method may further comprise transmitting a NACK message to the base station and receiving the cooperative transmission data again from the base station when an error has occurred in reception of the cooperative transmission data.

Preferably, the scheduling information may comprise at least one of positions of a subframe index and a resource block where a cooperative transmission is performed, a precoding scheme for a cooperative transmission, modulation and coding scheme (MCS) information for a cooperative transmission, and a type of a reference signal used for a cooperative transmission.

Preferably, the receiving scheduling information may further comprise transmitting an acknowledgement message of the scheduling information to the base station.

According to another embodiment of the present invention, there is provided a method for cooperatively transmitting a downlink between a base station and a relay station, the method comprising: receiving, from the base station, cooperative transmission data and scheduling information for a cooperative transmission of the cooperative transmission data; transmitting, to the base station, an acknowledgement message with respect to the cooperative transmission data or the scheduling information; and transmitting the cooperative transmission data to a terminal with reference to the scheduling information.

Preferably, the cooperative transmission data and the scheduling information may be transmitted from the base station with different levels of a Modulation and Coding Scheme (MCS).

Preferably, the cooperative transmission data and the scheduling information transmitted from the base station may be transmitted through different channels.

Preferably, the scheduling information may comprise at least one of positions of a subframe index and a resource block where a cooperative transmission is performed, a precoding scheme for a cooperative transmission, modulation and coding scheme (MCS) information for a cooperative transmission, and a type of a reference signal used for a cooperative transmission.

Preferably, in the occurrence of an error when receiving the cooperative transmission data transmitted from the base station, in the step of transmitting an acknowledgement message with respect to the cooperative transmission data, a NACK message with respect to the cooperative transmission data may be transmitted to the base station. Preferably, in the occurrence of an error when receiving the cooperative transmission data transmitted from the base station, in the step of transmitting the cooperative transmission data to the terminal, the cooperative transmission data having the reception error may be re-processed and the corrected cooperation transmission data may be transmitted to the terminal.

A message indicating that the cooperative transmission data transmitted to the terminal is the corrected cooperative transmission data may be together transmitted. The corrected cooperative transmission data may be re-processed through a simplified amplifying process having no decoding process with respect to the received cooperative transmission data, or through limited decoding procedures by a reconfiguration of a reference signal.

Preferably, the method may further comprise transmitting a NACK message to the base station and receiving the scheduling information again from the base station in the occurrence of an error when receiving the scheduling information transmitted from the base station.

According to still another embodiment of the present invention, there is provided a method for cooperatively transmitting a downlink between a base station and a relay station, the method comprising: receiving, from the base station, cooperative transmission data and scheduling information for a cooperative transmission of the cooperative transmission data; transmitting the cooperative transmission data to a terminal with reference to the scheduling information; and transmitting, to the base station, an acknowledgement message with respect to the cooperative transmission data or the scheduling information.

According to yet still another embodiment of the present invention, there is provided a method for cooperatively transmitting a downlink between a base station and a relay station, the method comprising: receiving cooperative transmission data from the base station, and transmitting an acknowledgement message with respect to the cooperative transmission data to the base station; transmitting, to the base station, scheduling information for a cooperative transmission of the cooperative transmission data; and receiving, from the base station, an acknowledgement message with respect to the scheduling information, and transmitting the cooperative transmission data to a terminal.

To achieve these and other advantages and in accordance with the purpose of the present invention, as embodied and broadly described herein, there is also provided an apparatus for cooperatively transmitting a downlink between a base station and a relay station in a broadband wireless communications system, the apparatus comprising: a receiver configured to receive, from the base station, cooperative transmission data and scheduling information of the cooperative transmission data; a transmitter configured to transmit the cooperative transmission data received to a terminal; and a controller configured to determine whether an error has occurred in reception of the cooperative transmission data or the scheduling information, and configured to re-process the cooperative transmission data when an error has occurred in reception of the cooperative transmission data, through a simplified amplifying process having no decoding process with respect to the cooperative transmission data, or through limited decoding procedures by a reconfiguration of a reference signal.

In the present invention, the scheduling information may be transmitted to the relay station from the base station even if an error has occurred in a transmission link between the base station and the relay station. This may prevent waste of wireless resources allocated to be transmitted to the terminal. Furthermore, this may prevent degraded transmission efficiency to the terminal occurring from that the base station and the relay station do not perform an effective cooperative transmission. And, this may solve a problem such as time delay occurring when a signal is transmitted to the terminal.

MODES FOR CARRYING OUT THE PREFERRED EMBODIMENTS

Figure 1:
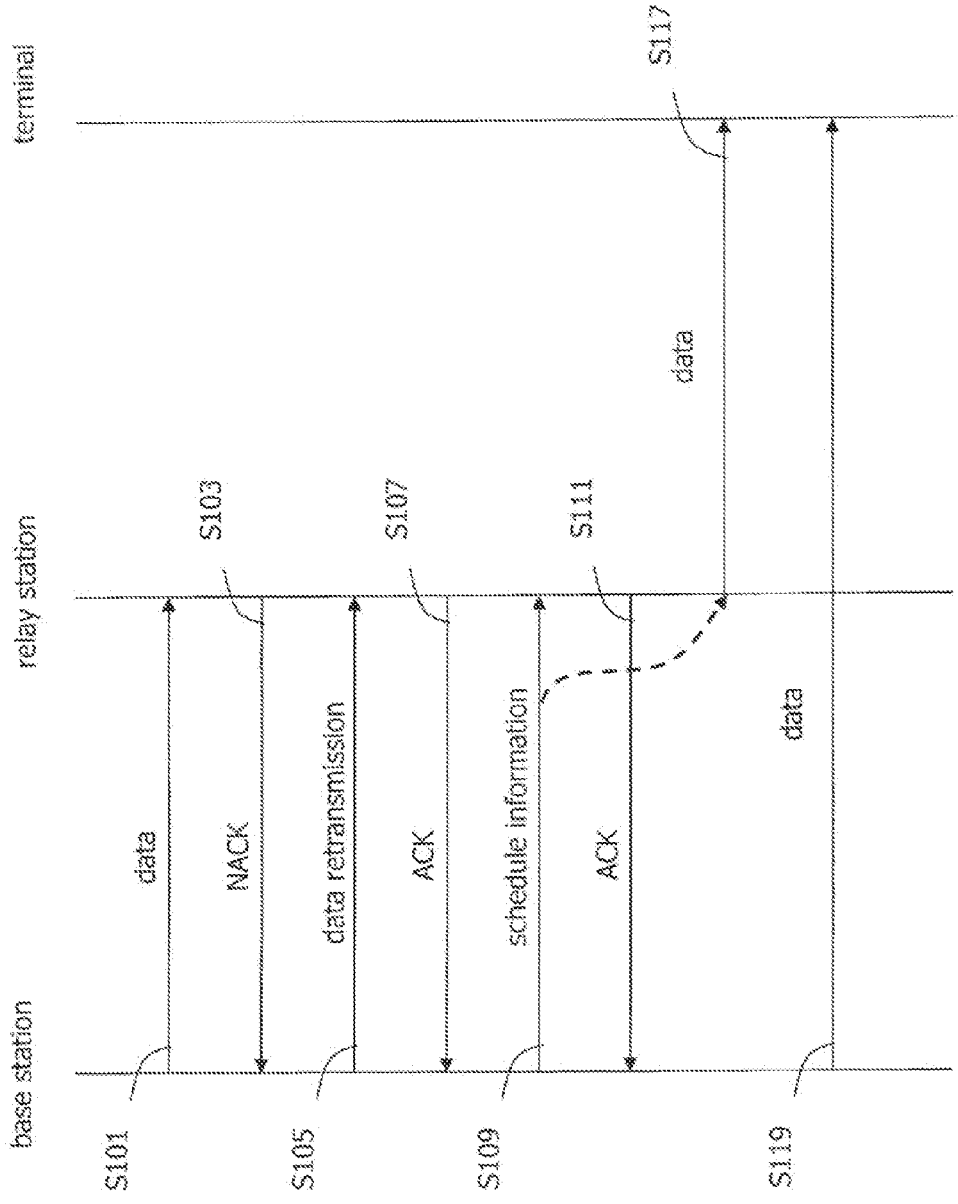
FIG. 1 is a configuration view illustrating procedures for cooperatively transmitting a downlink between a base station and a relay station according to one embodiment of the present invention, in which cooperative transmission data and scheduling information are transmitted at different time points.

The present invention is applied to a mobile communications system, and more particularly, to an IEEE802.16m system or an E-UMTS (Evolved Universal Mobile Telecommunications System) evolved from a UMTS (Universal Mobile Telecommunications System), etc. However, the present invention is not limited to this, but may be applied to all types of communications systems and communication protocols to which the techniques of the present invention may be applicable.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Though terms including ordinal numbers such as a first, a second, etc. may be used to explain various components, the components are not limited to the terms. The terms are used only for the purposed of distinguishing one component from another component. For instance, a first component may be referred to as a second component, or similarly, the second component may be referred to as the first component, without departing from the scope of the present invention. A term 'and/or' is used to include a combination of a plurality of disclosed items or one of the items.

In a case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

The terms used in the present invention will be explained as follows.

A communications system of the present invention indicates a system for providing various communication services such as voice and packet data, which includes a base station and a terminal. This communications system may be represented as an IEEE802.16m system, an LTE (Long Term Evolution) system or an LTE-Advanced system.

A terminal of the present invention may be referred to as an SS (Subscriber Station), a UE (User Equipment), an ME (Mobile Equipment), an MS (Mobile Station), etc. This terminal includes a portable device having a communication function, such as a portable phone, a PDA, a smart phone and a notebook, or an unportable device such as a PC and a vehicle-mounted device.

A baser station of the present invention indicates a fixed point communicated with a terminal, which may be referred to as an eNB (evolved-NodeB), a BTS (Base Transceiver System), an AP (Access Point), etc. One base station may have one or more cells, and an interface for transmission of a user traffic or a control traffic may be used between base stations. A downlink indicates a communication channel from the base station to the terminal, and an uplink indicates a communication channel from the terminal to the base station.

A multiple access technique applied to a wireless communications system of the present invention may include CDMA (Code Division Multiple Access), TDMA (Time Division Multiple Access), FDMA (Frequency Division Multiple Access), SC-FDMA (Single Carrier-FDMA), OFDMA (Orthogonal Frequency Division Multiple Access), or well-known other modulation techniques.

A multiple access technique for a downlink transmission may be different from a multiple access technique for an uplink transmission. For instance, an OFDMA technique may be used for a downlink transmission, whereas an SC-FDMA technique may be used for an uplink transmission.

Reference will now be given in detail to the preferred embodiments of the present invention, examples of which are illustrated in the accompanying drawings. Wherever possible, the same reference numerals will be used through the drawings to refer to the same or similar parts, and the same descriptions thereof are omitted.

The terminal of the present invention may perform a communication with the base station directly or via the relay station. The relay station may attempt decoding with respect to data transmitted to the terminal from the base station, and may generate an ACK/NACK message with respect to the data to transmit the generated ACK/NACK message to the base station.

In order for the terminal to acquire a diversity gain by utilizing the relay station, the base station and the relay station data have to transmit, to the terminal, data having undergone a precoding, etc. so as to acquire the same data or diversity, by using the same wireless resources. Then, the terminal may properly combine the two signals with each other. Alternatively, the data is transmitted by using different wireless resources, and information indicating a type of wireless resources utilized by each data is also transmitted to the terminal. This may allow the terminal to properly combine the two signals with each other. For this cooperative transmission, scheduling information has to be exchanged between the base station and the relay station. Here, the scheduling information includes a time point and a position of resources to be transmitted (e.g., positions of a subframe index and a resource block where a cooperative transmission is performed), a precoding scheme, a modulation and coding scheme (MCS) to be used, a type of a reference signal used for a cooperative transmission, and so on.

Hereinafter, will be explained combinations of sequences (orders) by which each type of signals are transmitted among the base station, the relay station and the terminal for a cooperative communication between the base station and the relay station, and characteristics thereof. Especially, when selecting a cooperative communication method, a channel change speed of the terminal which receives a cooperative transmission has to be considered. For instance, if the terminal has a fast channel change speed, a performance may be degraded due to a channel change. Accordingly, it is preferable to adopt a scheme having short time delay until a cooperative transmission time point, and to determine a cooperative transmission time point. On the other hand, if the terminal has a slow channel change speed, it is preferable to adopt a scheme capable of implementing a reliable operation in spite of long time delay until a cooperative transmission time point.

An embodiment in which scheduling is performed by a base station

1. Separate Transmission of Cooperative Transmission Data and Scheduling Information Hereinafter, will be explained an embodiment in which cooperative transmission data and scheduling information are separately transmitted to a relay station from a base station when the base station performs scheduling and a terminal receives a control signal from the base station.

FIG. 1 is a configuration view illustrating procedures for cooperatively transmitting a downlink between a base station and a relay station according to one embodiment of the present invention, in which cooperative transmission data and scheduling information are transmitted at different time points.

The base station transmits cooperative transmission data to the relay station (S101).

The relay station transmits, to the base station, an acknowledgement message indicating whether the cooperative transmission data transmitted from the base station has been successfully received. When the cooperative transmission data has an error, the relay station transmits a NACK message to the base station (S103).

The base station having received the NACK message retransmits the cooperative transmission data to the relay station (S105). When the relay station has successfully received the cooperative transmission data, the relay station transmits an ACK message to the base station (S107).

For a stable cooperative transmission between the base station and the relay station, the base station transmits scheduling information for a cooperative transmission of corresponding data to the relay station after receiving, from the relay station, an ACK message with respect to cooperative transmission data (S109).

The scheduling information includes a time point and a position of resources to be transmitted by the relay station (e.g., positions of a subframe index and a resource block where a cooperative transmission is performed), a precoding scheme, a modulation and coding scheme (MCS) to be used, a type of a reference signal used for a cooperative transmission, and so on.

The relay station having received the scheduling information transmits, to the base station, an ACK message with respect to the scheduling information (S111). Then, the base station and the relay station perform a cooperative transmission by transmitting the cooperative transmission data to a terminal (S117, S119). Here, the relay station transmits the cooperative transmission data based on the scheduling information received in S109 (S117).

Figure 2:
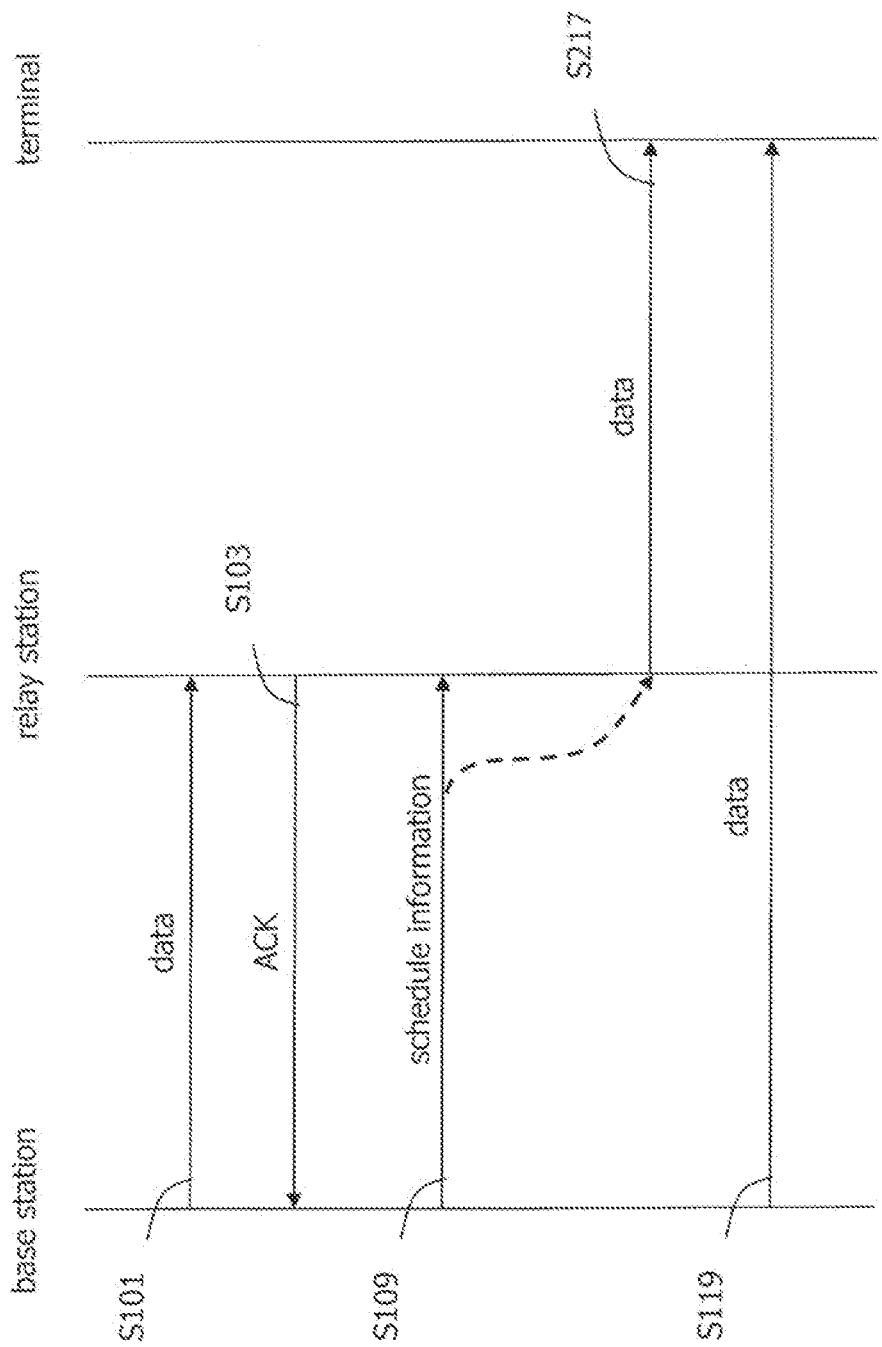
FIG. 2 is a configuration view illustrating procedures for cooperatively transmitting a downlink between a base station and a relay station according to another embodiment of the present invention, in which cooperative transmission data and scheduling information are transmitted at different time points.

FIG. 2 is a configuration view illustrating another embodiment in which cooperative transmission data and scheduling information are transmitted at different time points.

Like in FIG. 1, for a stable cooperative transmission between the base station and the relay station, the base station transmits scheduling information for a cooperative transmission of corresponding data to the relay station after receiving, from the relay station, an ACK message with respect to cooperative transmission data (S109).

However, in this embodiment, the base station performs a cooperative transmission of corresponding data together with the relay station, without receiving an ACK/NACK message feedback with respect to the scheduling information. More concretely, the relay station transmits cooperative transmission data to the terminal based on scheduling information, without transmitting ACK/NACK with respect to the scheduling information of the cooperative transmission data (S217).

Accordingly, it is preferable that the scheduling information is transmitted after undergoing a Modulation and Coding Scheme (MCS) so that the terminal can successfully receive the cooperative transmission data.

2. Simultaneous Transmission of Cooperative Transmission Data and Scheduling Information Hereinafter, will be explained an embodiment in which cooperative transmission data and scheduling information are simultaneously transmitted to a relay station from a base station when the base station performs scheduling and a terminal receives a control signal from the base station.

The embodiment will be explained in a case (A) where an ACK/NACK message is received from the relay station before a cooperative transmission time point between the base station and the relay station, and in a case (B) where an ACK/NACK message is received from the relay station after a cooperative transmission time point between the base station and the relay station.

Figure 3:
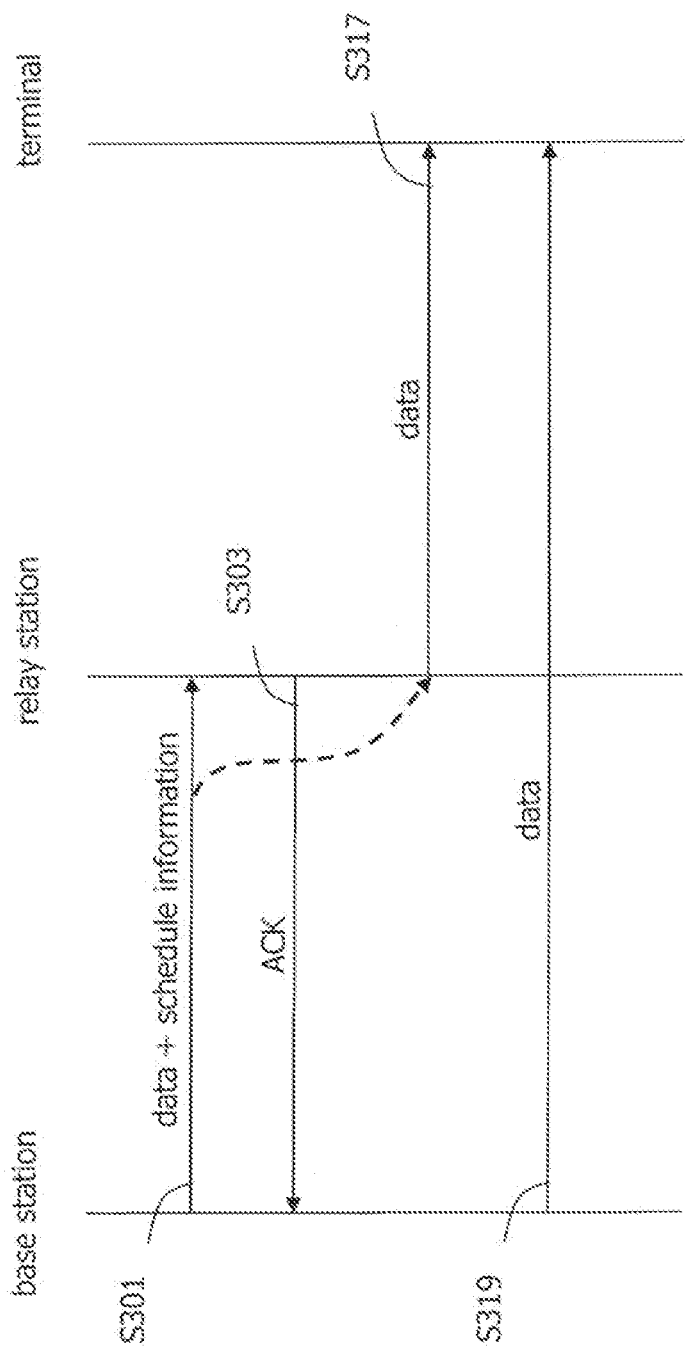
FIG. 3 is a configuration view illustrating procedures for cooperatively transmitting a downlink between a base station and a relay station according to one embodiment of the present invention, in which cooperative transmission data and scheduling information are simultaneously transmitted.

2 (A). A Case where an ACK/NACK Message is Received from the Relay Station Before the Base Station and the Relay Station Perform a Cooperative Transmission FIG. 3 is a configuration view illustrating procedures for cooperatively transmitting a downlink between the base station and the relay station according to one embodiment of the present invention, in which cooperative transmission data and scheduling information are simultaneously transmitted.

The base station transmits, to the relay station, cooperative transmission data and scheduling information for a cooperative transmission of corresponding data (S301).

The relay station transmits, to the base station, an acknowledgement message indicating whether the cooperative transmission data and the scheduling information transmitted from the base station have been successfully received. When the cooperative transmission data and the scheduling information have been successfully received, the relay station transmits an ACK message to the base station (S303).

In this embodiment, it is preferable that a cooperative transmission time point indicated by scheduling information transmitted to the relay station from the bases station together with cooperative transmission data is after a time point when the base station receives an ACK message from the relay station. More concretely, the scheduling information preferably indicates a time (duration) long enough for the relay station to decode the cooperative transmission data and the scheduling information, and long enough for the base station to perform a cooperative transmission after receiving a response from the relay station. The base station can check whether the relay station has successfully received the cooperative transmission data, before performing a cooperative transmission with the relay station. This may allow the base station to perform a different operation according to whether the cooperative transmission data and the scheduling information received from the relay station have been acknowledged (ACK) or not (NACK).

The scheduling information includes a time point and a position of resources to be transmitted by the relay station, a position (e.g., positions of a subframe index and a resource block where a cooperative transmission is performed), a precoding scheme, a modulation and coding scheme (MCS) to be used, a type of a reference signal used for a cooperative transmission, and so on.

Then, the base station and the relay station perform a cooperative transmission by transmitting the cooperative transmission data to the terminal (S317, S319). Here, the relay station transmits the cooperative transmission data based on the scheduling information received in S301 (S317).

FIGS. 4 to 8 are views illustrating modified embodiments according to whether cooperative transmission data and scheduling information have been acknowledged (ACK) or have not been acknowledged (NACK) when the cooperative transmission data and the scheduling information are simultaneously transmitted.

Figure 4:
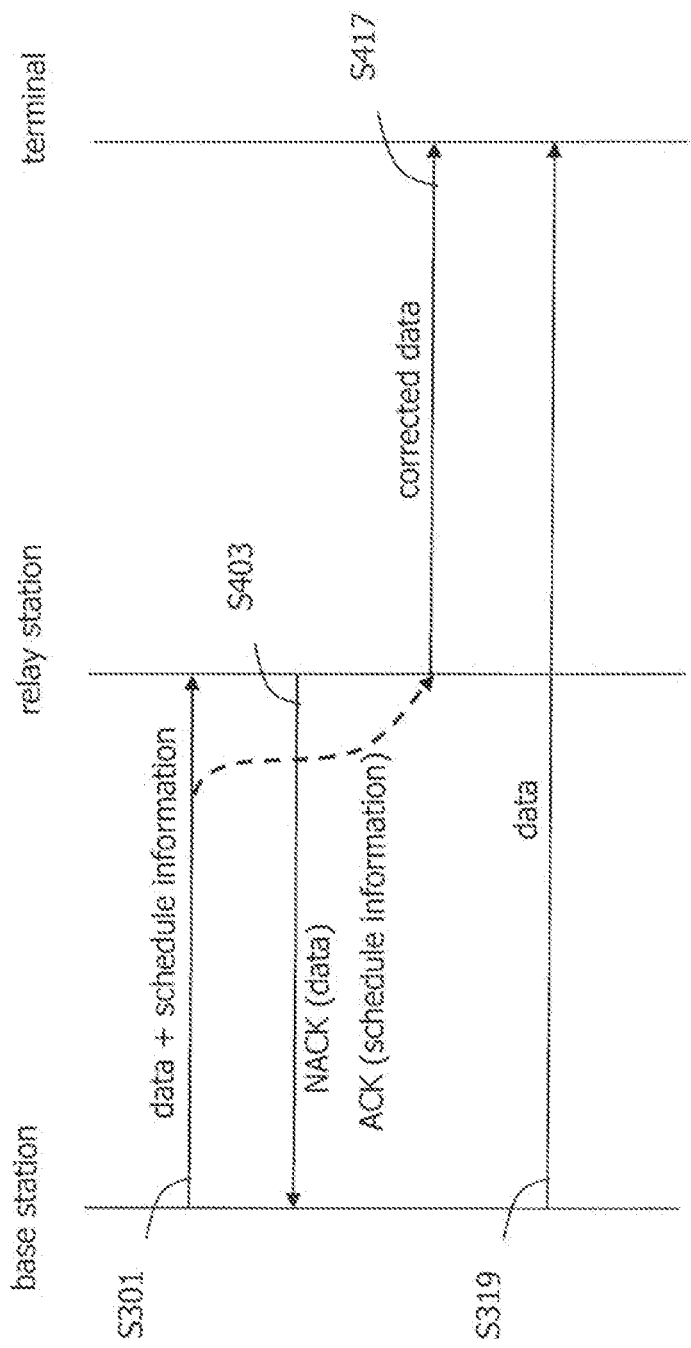
FIG. 4 is a view illustrating a method for attempting decoding by a terminal through combinations with a signal received from a base station, by re-processing received data and then transmitting the re-processed data to the terminal by a relay station which has failed to decode cooperative transmission data.

FIG. 4 illustrates a method for attempting decoding by the terminal through combinations with a signal received from the base station, by re-processing received data and then transmitting the re-processed data to the terminal by the relay station which has failed to decode cooperative transmission data.

The relay station transmits, to the base station, an acknowledgement message indicating whether cooperative transmission data and scheduling information transmitted from the base station have been successfully received. When the cooperative transmission data has had an error even if the scheduling information has been successfully received, the relay station transmits, to the base station, a NACK message with respect to the cooperative transmission data and an ACK message with respect to the scheduling information (S403).

The relay station re-processes the cooperative transmission data received from the base station, and transmits corrected data to a terminal (S417). Then, the base station transmits the cooperative transmission data to the terminal (S319) to perform a cooperative transmission.

For implementation of the above operation, the relay station has to successfully receive the scheduling information even if it fails to receive the cooperative transmission data. For this, the scheduling information may be set (established) to undergo a modulation and coding scheme (MCS) having a relatively lower transmission rate to enhance reliability. On the other hand, the cooperative transmission data may be set (established) to undergo a modulation and coding scheme (MCS) having a relatively higher transmission rate for maximized transmission efficiency.

Alternatively, the base station may transmit the scheduling information with more enhanced reliability through a control channel separate from a control channel of the cooperative transmission channel.

In this embodiment, the base station or the relay station may inform the terminal that a signal received from the relay station has been acquired by re-processing the scheduling information having not been successfully received, by setting a proper field of a control channel through which a transmission to the terminal is performed. Then, the terminal may properly combine the cooperative transmission signal transmitted from the base station with the re-processed signal transmitted from the relay station by utilizing the information.

In this embodiment, the terminal may properly utilize the re-processed information received from the relay station without wasting wireless resources allocated to the relay station. This may allow a diversity gain to be obtained.

In the above configurations, the relay station may re-process the received data having an error in various manners. If a modulation and coding scheme (MCS) between the base station and the relay station (BS-RS) is equal to that between the relay station and the terminal (mobile station) (RS-MS), the relay station may perform amplify-and-forwarding without decoding a received signal, or may retransmit a received signal after merely performing a limited procedure. For instance, a position of resources may be re-controlled by removing a reference signal of a link between the BS and the RS, and by newly having a reference signal of the RS. Alternatively, a result of demodulation may be transmitted without undergoing a hard decision. However, the received data having an error preferably undergoes another MCS since a channel characteristic between the BS and the RS may be different from that between the RS and the MS.

In this case, a following method may be proposed among usable re-processing methods. The relay station may decode a received signal to restore into an information packet, and acquire a first probability sequence indicating probability information of each information bit which consists of the information packet. Then, the relay station may encode the information packet into an MCS corresponding to the section between the RS and the MS, thereby acquiring a code packet. And, the relay station may acquire a second probability sequence indicating probability information of each code bit which consists of the code packet, according to the first probability sequence. Then, the relay station may constitute a modulation symbol by using the second probability sequence, and transmit the modulation symbol the terminal.

Figure 5:
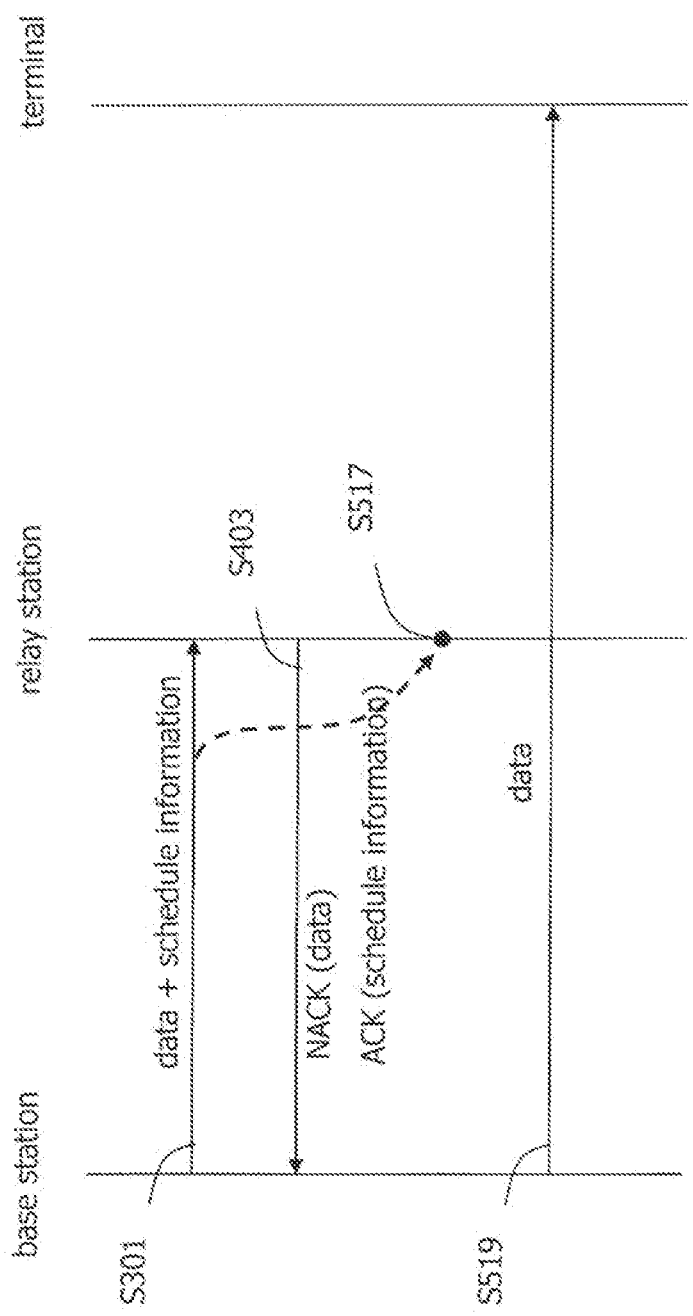
FIG. 5 is a view illustrating a method not using corresponding wireless resources by a relay station which has failed to decode cooperative transmission data, in order to minimize interference of data transmitted to a terminal from a base station.

FIG. 5 is a view illustrating a method not using corresponding wireless resources by the relay station which has failed to decode cooperative transmission data, in order to minimize interference of data transmitted to the terminal from the base station.

The relay station transmits, to the base station, an acknowledgement message indicating whether the cooperative transmission data and the scheduling information transmitted from the base station have been successfully received. When the cooperative transmission data has had an error even if the scheduling information has been successfully received, the relay station transmits, to the base station, a NACK message with respect to the cooperative transmission data and an ACK message with respect to the scheduling information (S403).

Here, the relay station checks, from the received scheduling information, a type of wireless resources allocated for a cooperative transmission. And, the relay station does not use the wireless resources so as to minimize interference of the cooperative transmission data transmitted to the terminal from the base station (S517).

Since the relay station does not perform a transmission to the terminal, the base station performs a single transmission rather than a cooperative transmission (S519). Preferably, the base station may change an MCS, a precoding scheme, and so on used for data transmission for efficient transmission.

Figure 6:
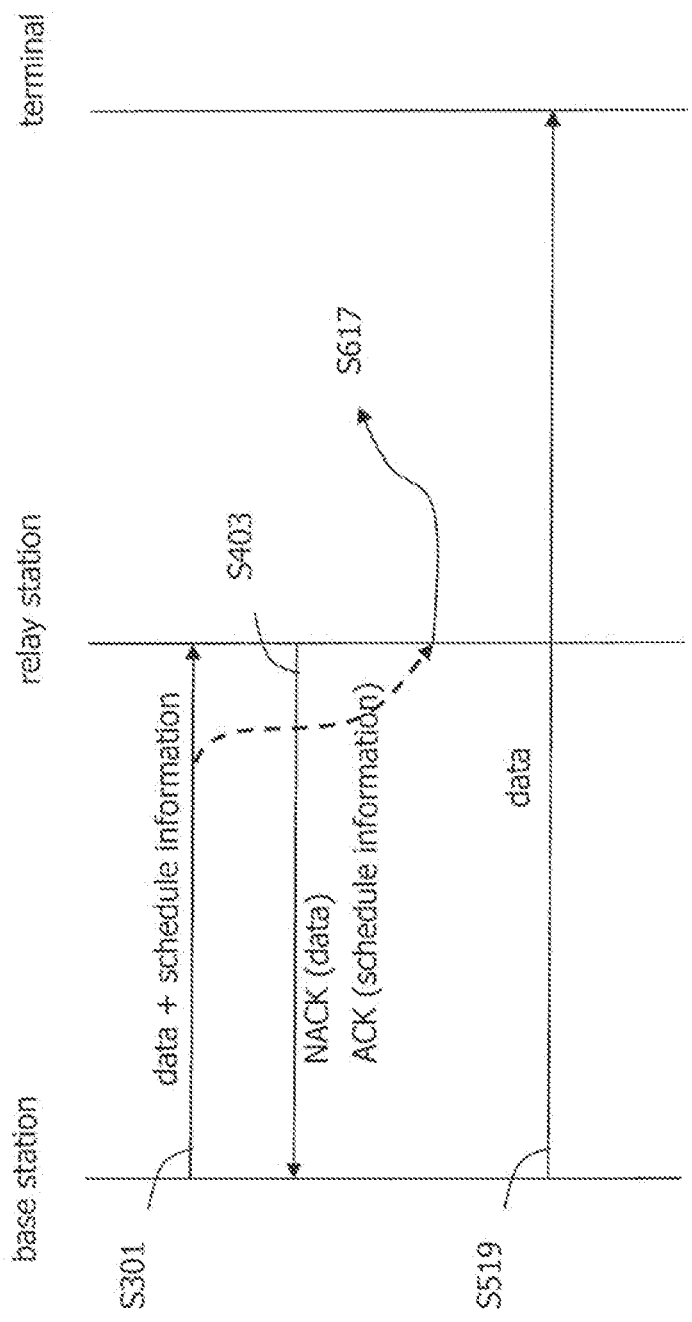
FIG. 6 is a view illustrating a method for abandoning a communication with the existing terminal for a cooperative transmission and performing a communication with a new terminal by a relay station.

FIG. 6 is a view illustrating a method for abandoning a communication with the existing terminal for a cooperative transmission and performing a communication with a new terminal by the relay station (S617).

Here, the relay station does not utilize the scheduling information received from the base station.

Since the relay station does not perform a transmission to the terminal, the base station performs a single transmission rather than a cooperative transmission like in the aforementioned embodiment of FIG. 5. Accordingly, the base station may change an MCS, a precoding scheme, and so on used for data transmission.

One operation to be performed by the base station among the three operations shown in FIGS. 4, 5 and 6 may be regulated by a communication standard, or may be determined in advance through a signal exchanged between the base station and the relay station. Alternatively, when transmitting an ACK/NACK message to the base station, the relay station may inform the base station an operation to be performed by the relay station (S417 or S517 or S617) by adding a field into a message, the field indicating a type of one operation selected among the operations.

In a case where the base station has received, from the relay station, an ACK message with respect to the cooperative transmission data and a NACK message with respect to the scheduling information, the base station may attempt a cooperative transmission again by retransmitting only the scheduling information with respect to a cooperative transmission to the relay station.

Figure 7:
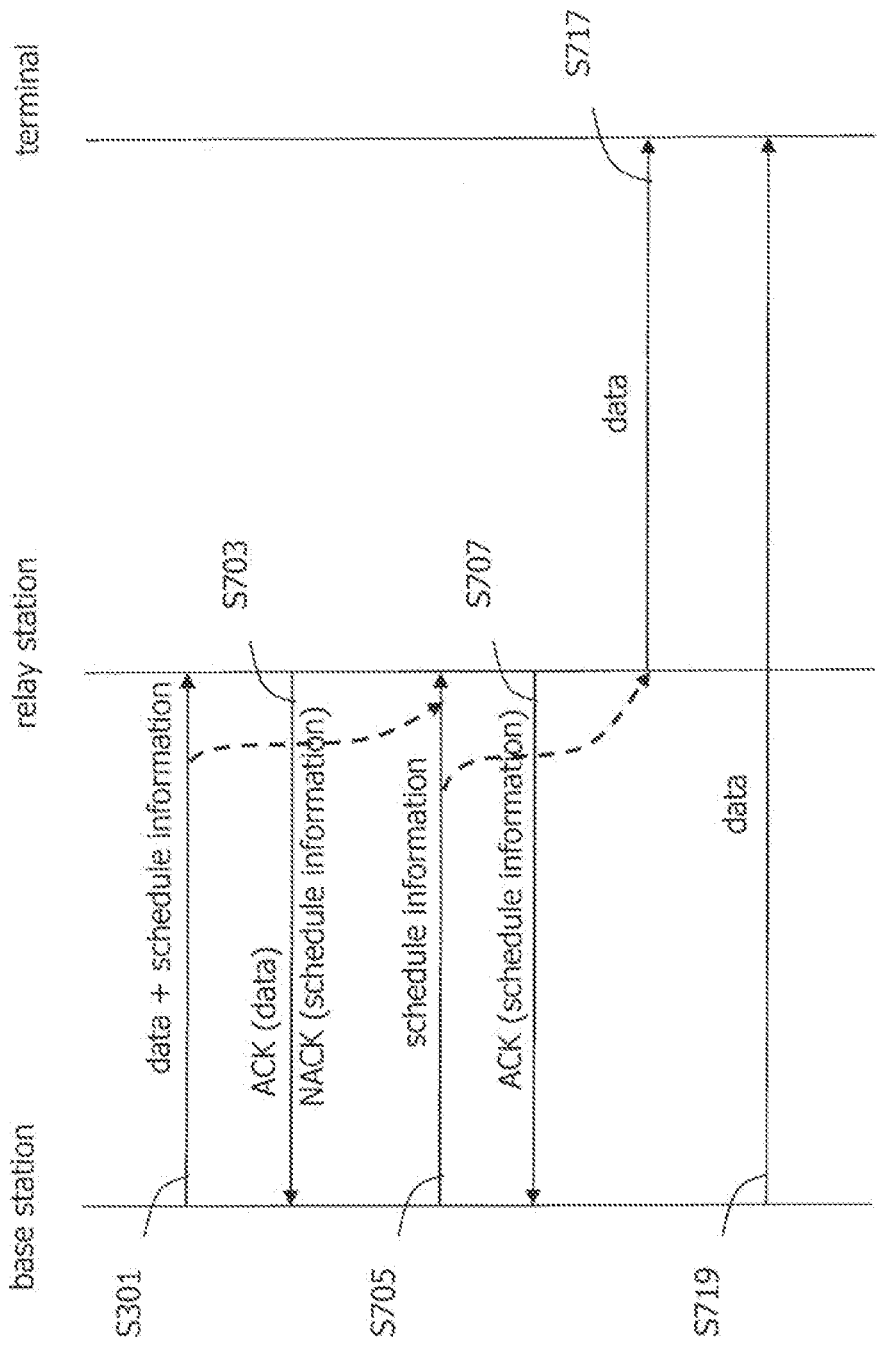
FIG. 7 is a view illustrating a cooperative transmission scheme through retransmission of scheduling information according to one embodiment of the present invention.

FIG. 7 is a view illustrating a cooperative transmission scheme through retransmission of scheduling information according to one embodiment of the present invention.

As shown, when the scheduling information received from the base station has had an error even if the cooperative transmission data has been successfully received, the relay station transmits a NACK message with respect to the scheduling information to the base station (S703).

The base station retransmits, to the relay station, corrected scheduling information for a cooperative transmission of the cooperative transmission data (S705).

Then, the relay station having received the scheduling information transmits, to the base station, an ACK message with respect to the scheduling information (S707). Then, the base station having received the ACK message performs a cooperative transmission with respect to the cooperative transmission data together with the relay station (S717, S719).

Figure 8:
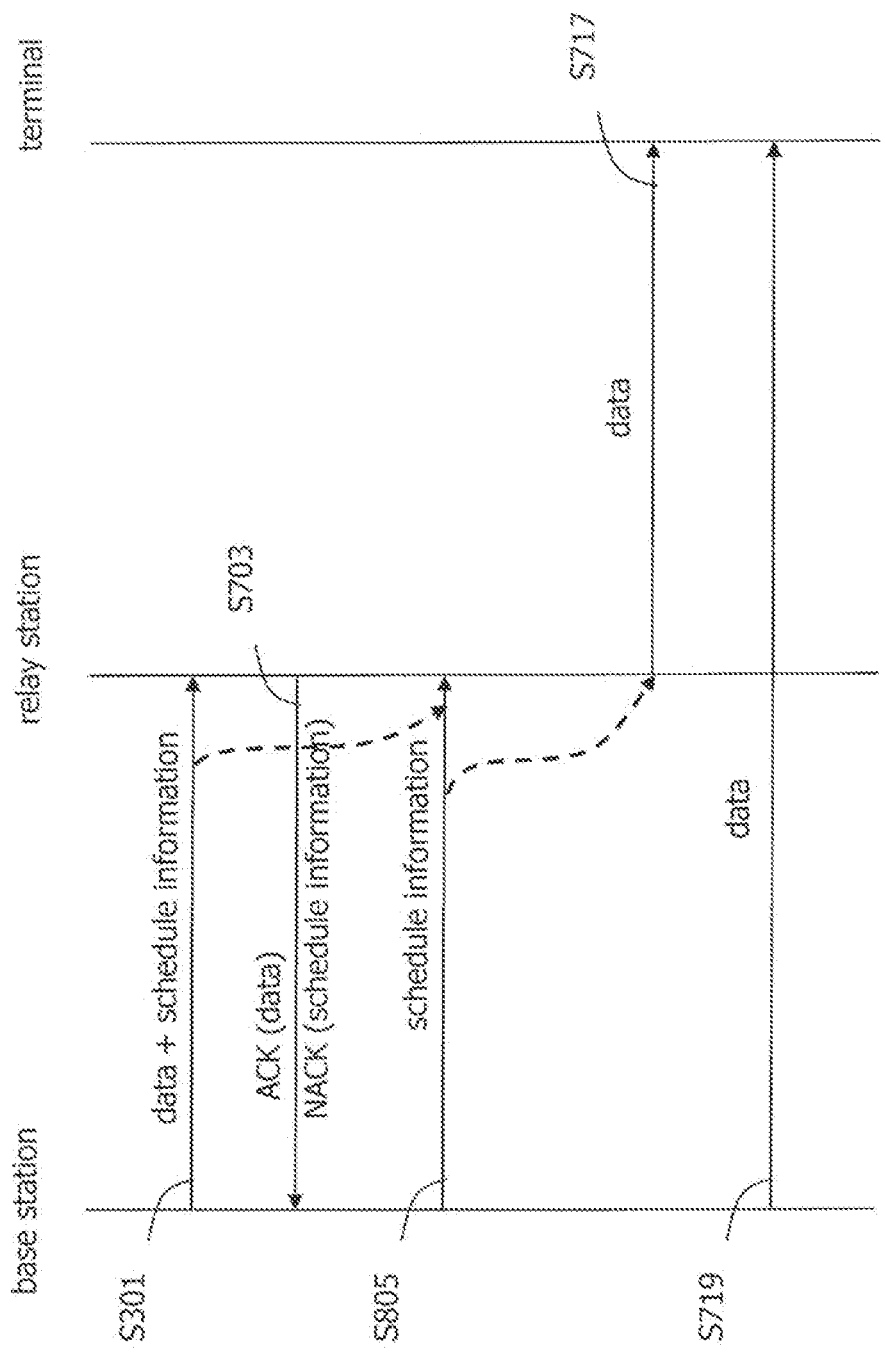
FIG. 8 is a view illustrating a cooperative transmission scheme through retransmission of scheduling information according to another embodiment of the present invention.

FIG. 8 is a view illustrating a cooperative transmission scheme through retransmission of scheduling information according to another embodiment of the present invention.

Like in the aforementioned embodiment of FIG. 7, once the base station retransmits the scheduling information for a cooperative transmission of the cooperative transmission data to the relay station (S805), the relay station performs a cooperative transmission for the terminal without transmitting an ACK/NACK message with respect to the scheduling information to the base station (S717). In the case where the relay station does not transmit a feedback signal with respect to the scheduling information to the base station, a cooperative transmission may be performed at an earlier time point than in the aforementioned embodiment of FIG. 7. Preferably, the cooperative transmission scheme of FIG. 8 may be applied to a case where a cooperative transmission time point is prior to a time point when an ACK/NACK message with respect to retransmission of scheduling information is received.

Preferably, the scheduling information is transmitted after undergoing an MCS sufficiently so as to be successfully received by the relay station.

So far, with reference to FIGS. 3 to 8, were explained various embodiments in which the base station simultaneously transmits cooperative transmission data and scheduling information to the relay station. However, the cooperative transmission scheme of the present invention may be applied by firstly transmitting scheduling information to the relay station and then transmitting cooperative transmission data from the base station.

For instance, when the base station firstly transmits scheduling information to the relay station and then transmits cooperative transmission data after receiving an ACK message, the relay station may transmit, to the base station, an NACK message with respect to the cooperative transmission data. This corresponds to the aforementioned cases of FIGS. 4, 5 and 6 in which a NACK message with respect to the cooperative transmission data and an ACK message with respect to the scheduling information are transmitted. Accordingly, the base station and the relay station may perform one of the three operations aforementioned in FIGS. 4, 5 and 6.

2 (B). A Case where an ACK/NACK Message is Received from the Relay Station after the Base Station and the Relay Station Perform a Cooperative Transmission In the following embodiments, a cooperative transmission time point indicated by scheduling information transmitted to the relay station from the bases station together with cooperative transmission data is equal to, or is after a time point when the base station receives an ACK/NACK message from the relay station.

Figure 9:
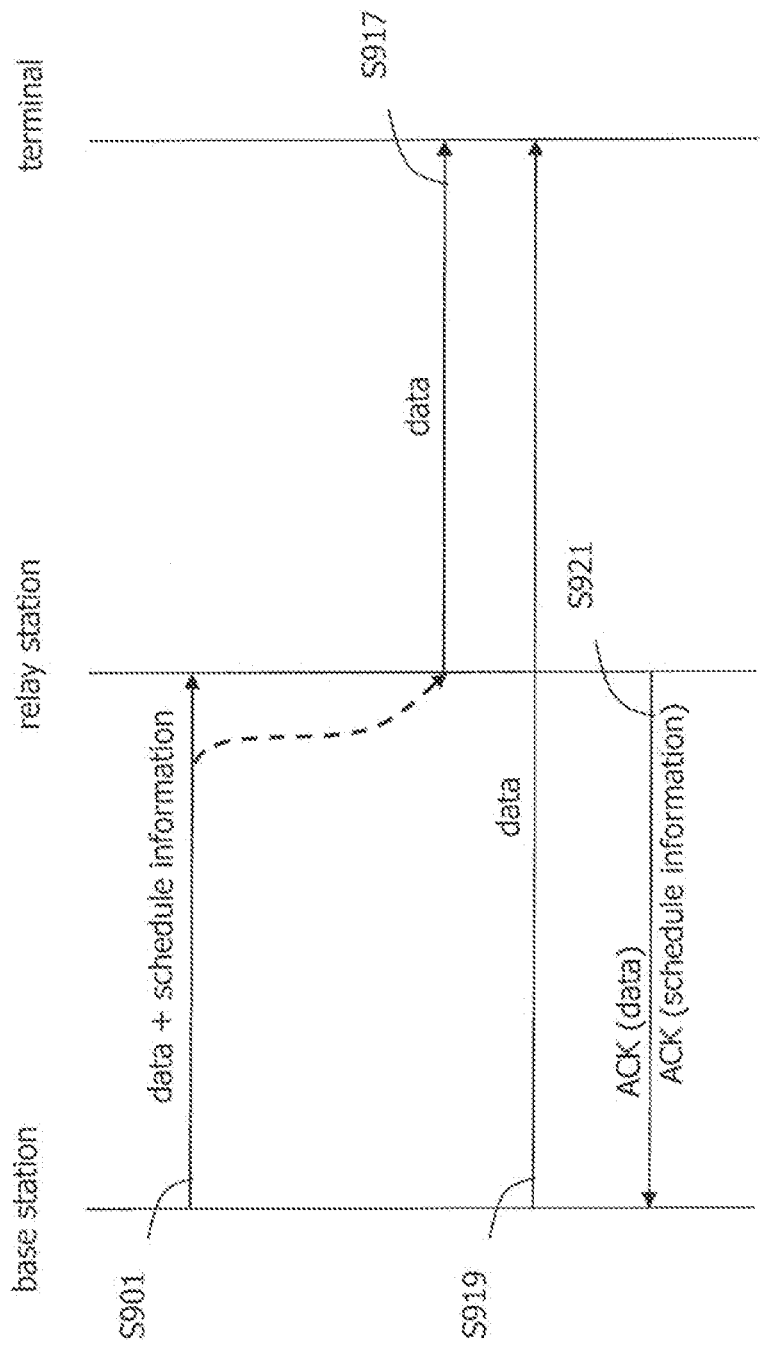
FIG. 9 is a view illustrating a case where a time point when a base station transmits scheduling information to a relay station together with cooperative transmission data is before a time point when the base station receives an ACK message from the relay station.

More concretely, as shown in FIG. 9, the relay station having received cooperative transmission data and scheduling information from the base station (S901) transmits the cooperative transmission data to the terminal based on the scheduling information received before transmitting an ACK/NACK message (S917). Then, the relay station transmits an ACK message to the base station (S921).

If a time point when the base station transmits the scheduling information is greatly different from a time point when a cooperative transmission is performed, a channel situation corresponding to a time point when scheduling information for a cooperative transmission is transmitted to the relay station is different from a channel situation corresponding to a time point when a cooperative transmission is substantially performed. This may lower efficiency of a cooperative transmission. Accordingly, the aforementioned configuration may be attempted. Especially, if a time point when a backhaul link between the base station and the relay station is generated is irregular, or if a gap between time points for generation is large, it may take a lot of time for the base station to wait for an ACK/NACK message with respect to the scheduling information. Or, it may be difficult to predict a time point when an ACK/NACK message is to be transmitted. Accordingly, the following method may be effective. In order to obtain a time duration for which the relay station decodes cooperative transmission data, a cooperative transmission time point may be before a time point when the relay station transmits an ACK/NACK message. However, the cooperative transmission time point is preferably set to be after a time point when the relay station completes decoding. The base station attempts a cooperative transmission before receiving an ACK/NACK message from the relay station. Therefore, it is impossible to check whether the relay station has successfully received the cooperative transmission data before the base station performs a cooperative transmission with the relay station. In this case, the base station and the relay station may perform an operation shown in FIGS. 10 to 12.

Figure 10:
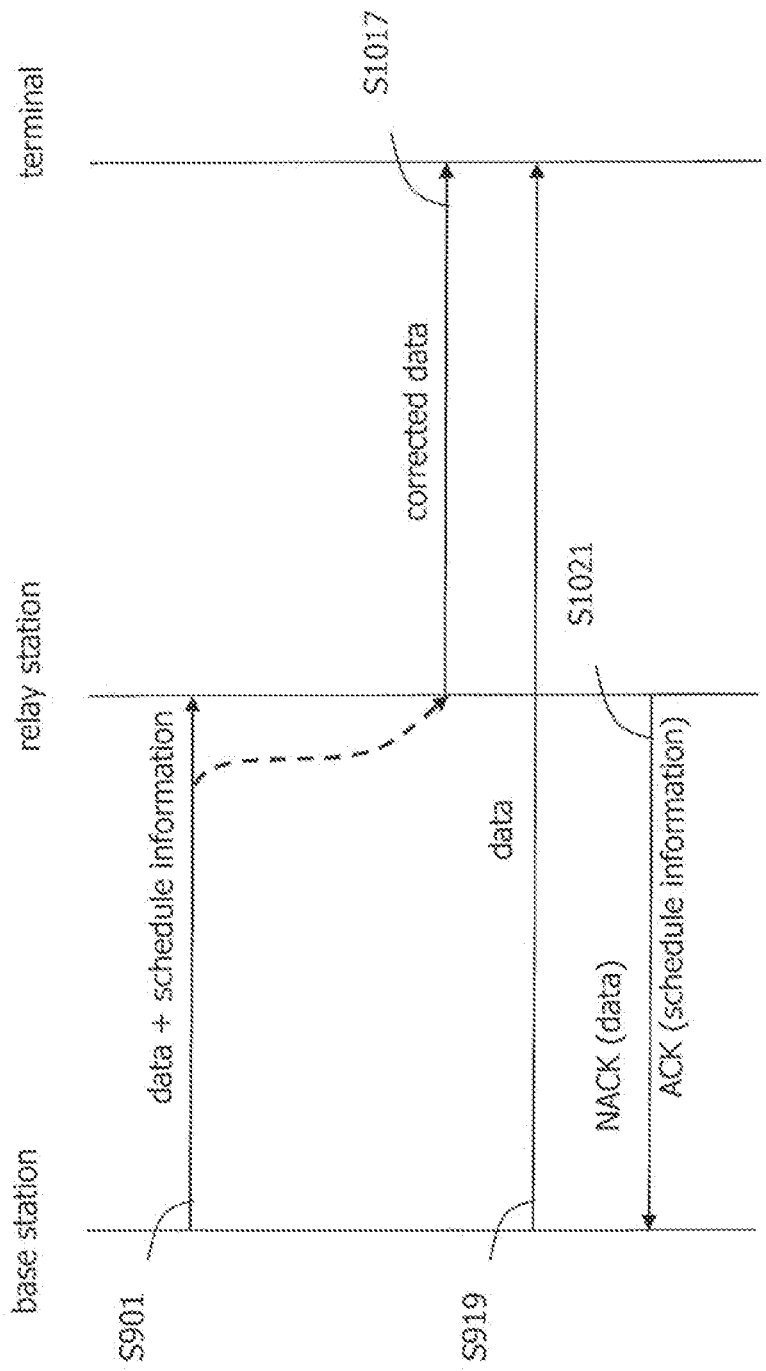
FIG. 10 is a view illustrating one embodiment of a cooperative transmission in a case where a relay station has failed to receive data but has succeeded in receiving scheduling information.

FIG. 10 is a view illustrating one embodiment of a cooperative transmission in a case where the relay station has failed to receive data but has succeeded in receiving scheduling information.

As shown in FIG. 10, the relay station re-processes received information to transmit the re-processes information to the terminal even if it has failed to decode cooperative transmission data (S1017). Then, the terminal performs decoding by properly combining the signal received from the base station with the re-processed (corrected) information received from the relay station.

For implementation of the above operation, the relay station has to successfully receive the scheduling information even if it fails to receive the cooperative transmission data. For this, the scheduling information may be set (established) to undergo a modulation and coding scheme (MCS) having a relatively lower transmission rate to enhance reliability. On the other hand, the cooperative transmission data may be set (established) to undergo a modulation and coding scheme (MCS) having a relatively higher transmission rate for maximized transmission efficiency. Alternatively, the base station may transmit the scheduling information with more enhanced reliability through a control channel separate from a control channel of the cooperative transmission channel. In this embodiment, the base station may inform the terminal that a signal received from the relay station has been acquired by re-processing the scheduling information having not been successfully received, by setting a proper field of a control channel through which a transmission to the relay station is performed. Then, the terminal may properly combine the cooperative transmission signal transmitted from the base station with the re-processed signal transmitted from the relay station by utilizing the information.

In this embodiment, the terminal may properly utilize the re-processed information received from the relay station without wasting wireless resources allocated to the relay station. This may allow a diversity gain to be obtained.

Figure 11:
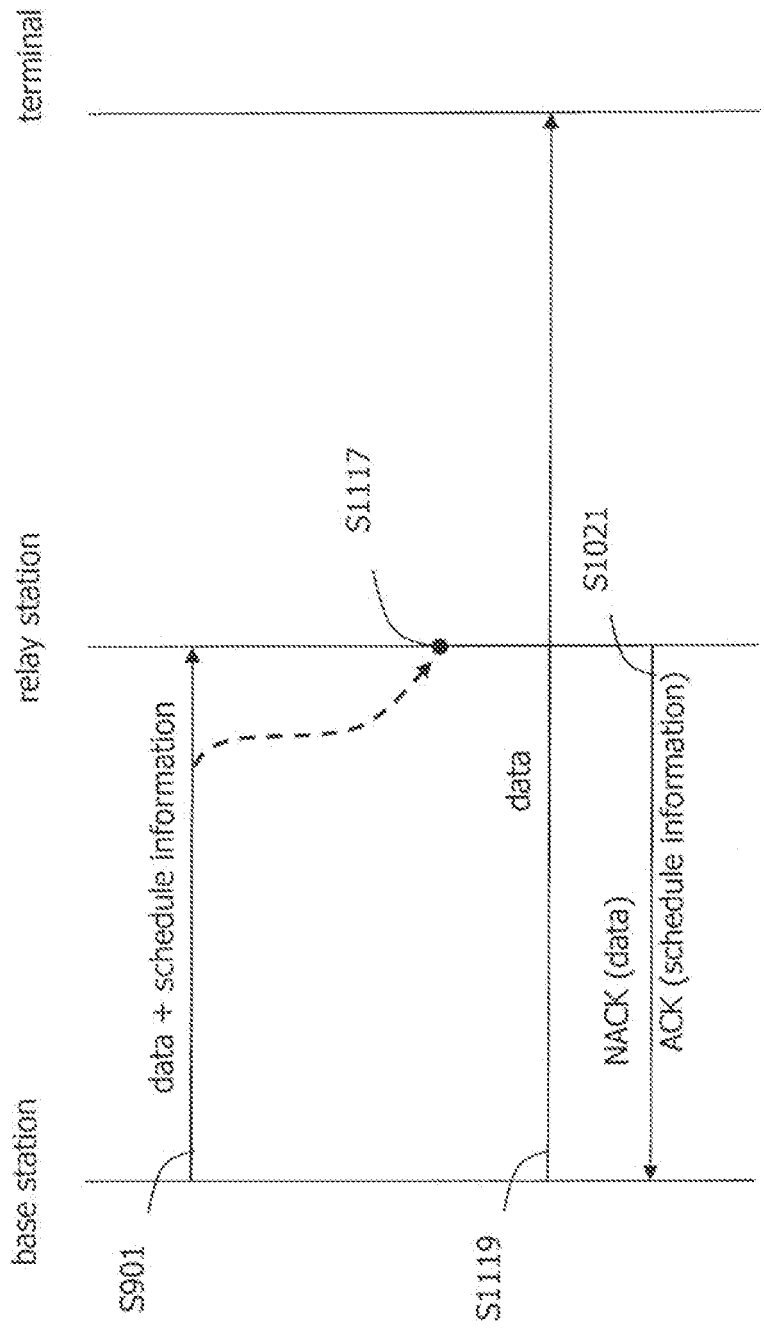
FIG. 11 is a view illustrating another embodiment of a cooperative transmission in a case where a relay station has failed to receive data but has succeeded in receiving scheduling information.

FIG. 11 is a view illustrating another embodiment of a cooperative transmission in a case where the relay station has failed to receive data but has succeeded in receiving scheduling information.

As shown, the relay station checks, from scheduling information received from the base station, a type of wireless resources allocated for a cooperative transmission. And, the relay station does not use the wireless resources so as to minimize interference of cooperative transmission data transmitted to the terminal from the base station (S1117). Since the relay station does not perform transmission to the terminal, the base station performs a single transmission rather than a cooperative transmission (S1121). Accordingly, the base station may transmit the cooperative transmission data to the terminal in a single manner, by changing an MCS, a precoding scheme and so on used for data transmission.

Figure 12:
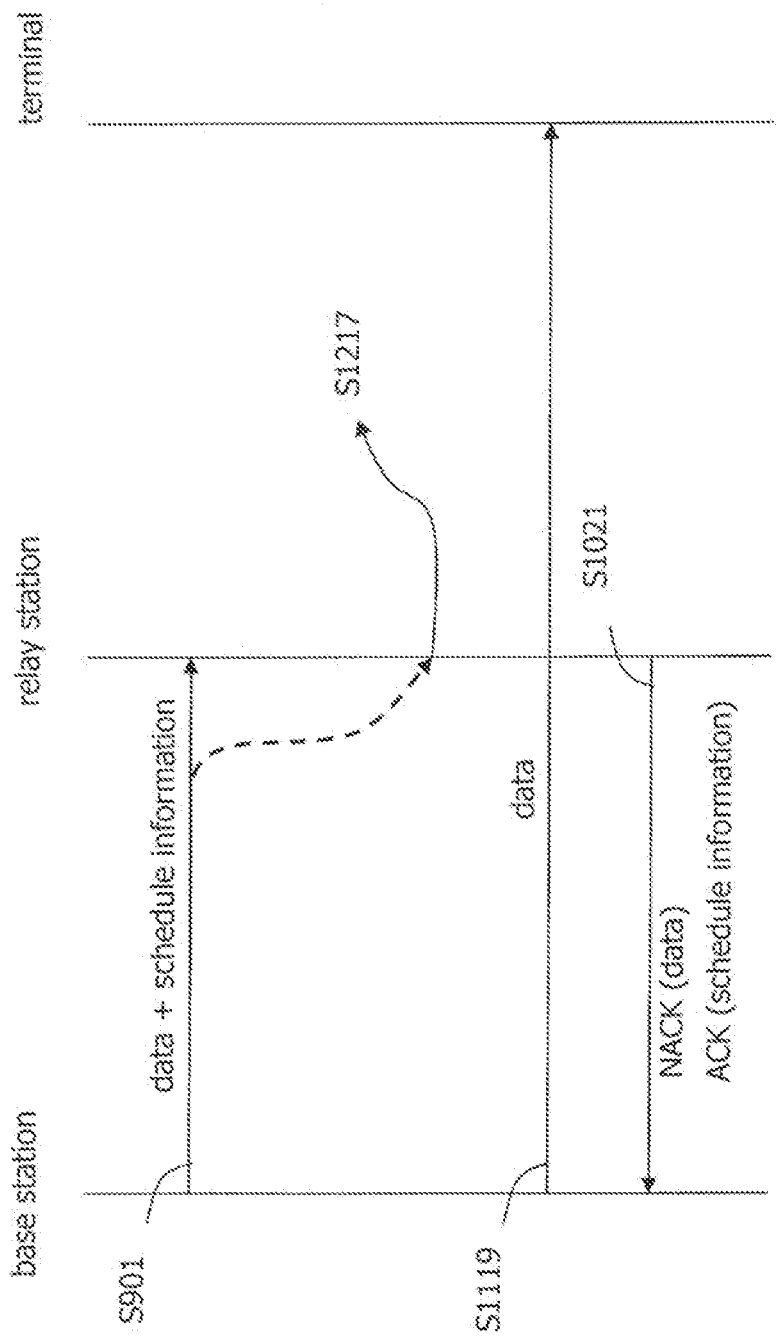
FIG. 12 is a view illustrating still another embodiment of a cooperative transmission in a case where a relay station has failed to receive data but has succeeded in receiving scheduling information.

FIG. 12 is a view illustrating still another embodiment of a cooperative transmission in a case where the relay station has failed to receive data but has succeeded in receiving scheduling information.

As shown, in this embodiment, the relay station abandons a communication with the existing terminal for a cooperative transmission, and performs a communication with a new terminal (S1217). Accordingly, the relay station does not utilize the scheduling information received from the base station.

Since the relay station does not perform a transmission to the terminal, the base station performs a single transmission rather than a cooperative transmission (S1121). Accordingly, the base station may change an MCS, a precoding scheme, and so on used for data transmission, and then may transmit the cooperative transmission data to the terminal in a single manner.

If the relay station has succeeded in receiving data but has failed to receive scheduling information, the relay station performs a communication with a new terminal and the base station performs a single transmission as shown in FIG. 12. Accordingly, the base station may change an MCS, a precoding scheme, and so on used for data transmission. Like in the embodiments shown in FIGS. 11 and 12, the base station may not recognize that an MCS, a precoding scheme, and so on used for data transmission should be changed since it does not know that it performs a single transmission. However, this problem may be solved by the conventional HARQ scheme or by allocating a dedicated reference signal.

So far, was explained a case in which the base station simultaneously transmits cooperative transmission data and scheduling information. However, the present invention may be also applied to a case in which the base station firstly transmits scheduling information to the relay station and then transmits cooperative transmission data. For instance, the base station firstly transmits scheduling information to the relay station and then transmits cooperative transmission data after receiving an ACK message. If a cooperative transmission has been performed before the base station receives an ACK/NACK message with respect to data, and if the relay station has failed to restore data, this corresponds to the aforementioned cases of FIGS. 10, 11 and 12 in which a NACK message with respect to the cooperative transmission data and an ACK message with respect to the scheduling information are transmitted. Accordingly, the base station and the relay station may perform one of the three operations aforementioned in FIGS. 10, 11 and 12.

Scheduling by the Relay Station/Receiving a Control Signal from the Relay Station by the Terminal Hereinafter, will be explained an embodiment in which the relay station performs a scheduling operation and the terminal receives a control signal from the relay station.

In this embodiment, the terminal receives data by receiving scheduling information from the relay station. Accordingly, it is assumed that the relay station has successfully received data from the base station before a cooperative transmission is performed. Even if the base station has received, from the relay station, an ACK message with respect to data which can be cooperatively transmitted, the base station stores the data for a predetermined time without deleting the data. Here, the predetermined time for which the base station stores data which can be cooperatively transmitted may be defined, and information on the predetermined time may be exchanged between the base station and the relay station through signaling. In a state that the base station and the relay station share the information, the relay station has to transmit scheduling information to the base station, the scheduling information indicating a type of wireless resources to be used by the base station for a cooperative transmission. This case may be divided into the following two embodiments of FIGS. 13 and 14 according to whether an ACK message with respect to scheduling information transmitted to the base station from the relay station exists or not.

Figure 13:
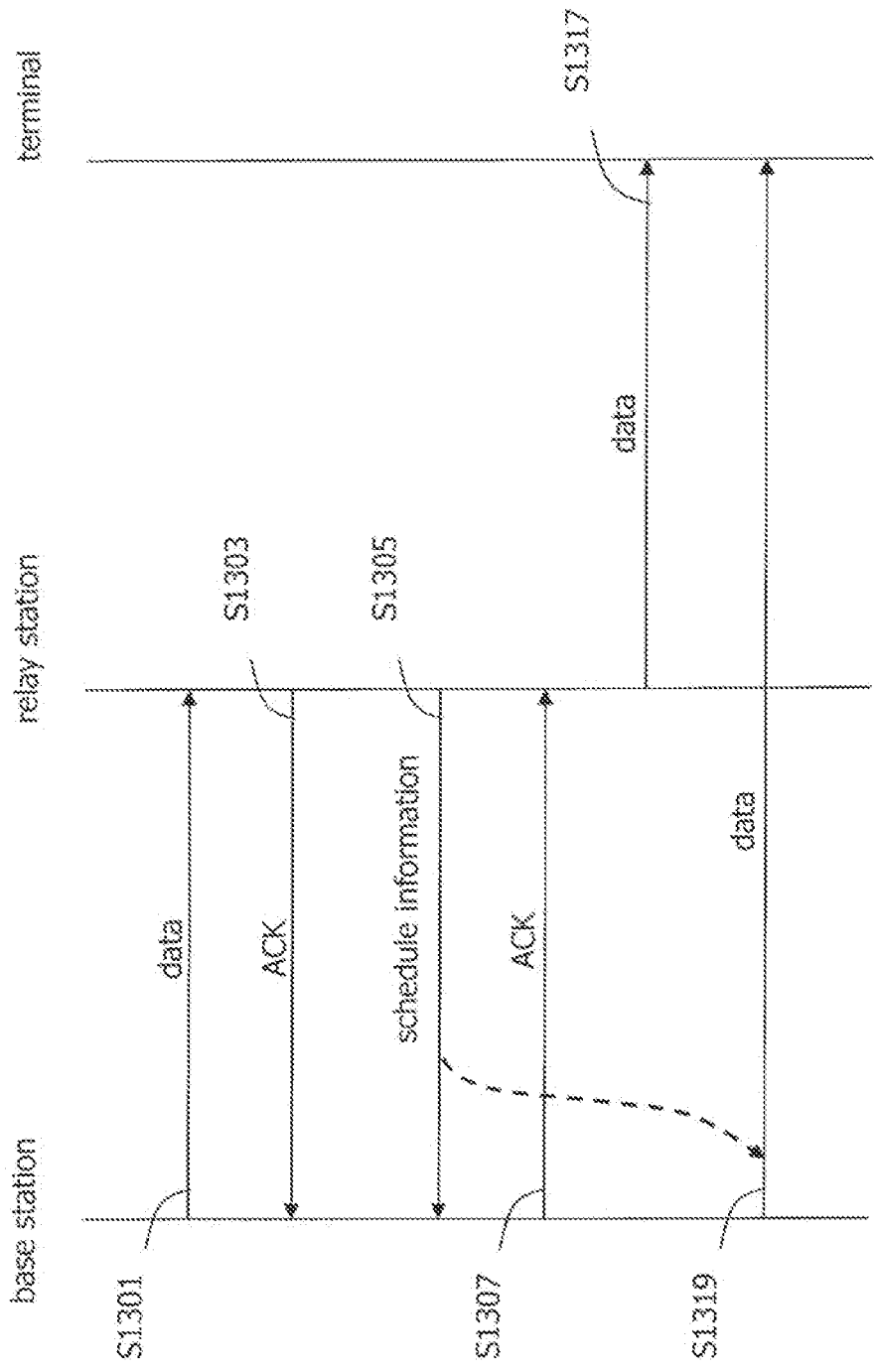
FIG. 13 is a view illustrating one embodiment of a cooperative transmission in a case where a relay station performs scheduling and a terminal receives a control signal from the relay station.

FIG. 13 is a view illustrating one embodiment of a cooperative transmission in a case where the relay station performs scheduling and the terminal receives a control signal from the relay station.

Firstly, the base station transmits cooperative transmission data to the relay station (S1301), and is fed back with an ACK message with respect to the cooperative transmission data from the relay station (S1303).

Even if the base station has received an ACK message with respect to the cooperative transmission data from the relay station, the base station stores the cooperative transmission data for a predetermined time without deleting the cooperative transmission data.

Then, the relay station transmits, to the base station, scheduling information indicating a type of wireless resources to be used by the base station for a cooperative transmission (S1305).

The base station transmits, to the relay station, an ACK message with respect to the scheduling information received from the relay station (S1307).

After receiving the ACK message from the base station, the relay station performs a cooperative transmission together with the base station (S1317, S1319).

Figure 14:
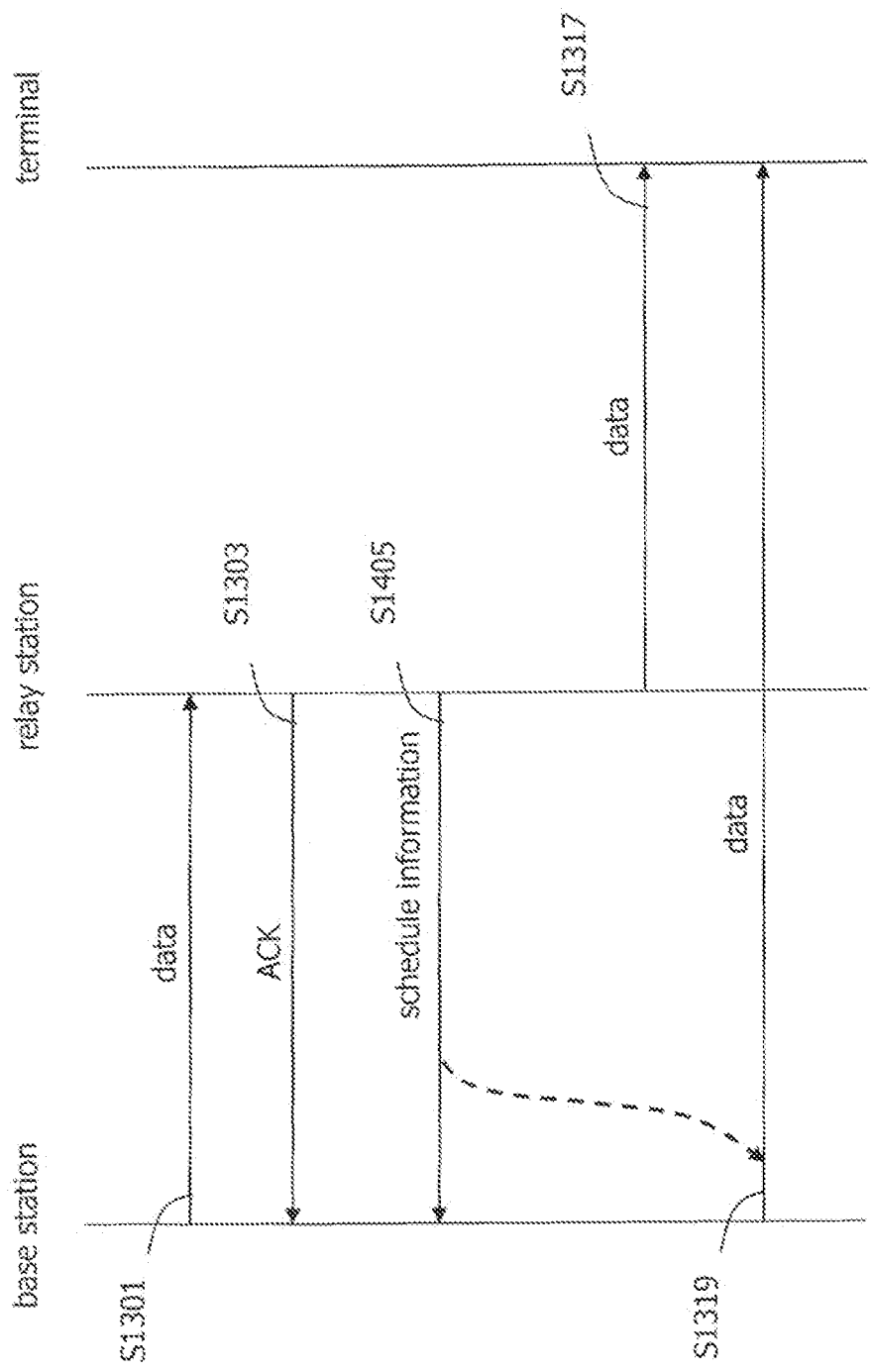
FIG. 14 is a view illustrating another embodiment of a cooperative transmission in a case where a relay station performs scheduling and a terminal receives a control signal from the relay station.

FIG. 14 is a view illustrating another embodiment of a cooperative transmission in a case where the relay station performs scheduling and the terminal receives a control signal from the relay station.

Like in the embodiment of FIG. 13, after the base station has received the scheduling information from the relay station, the base station performs a cooperative transmission together with the relay station by utilizing wireless resources allocated from the scheduling information, without transmitting an ACK/NACK message with respect to the scheduling information. In this case, for enhanced reliability, the scheduling information (S1405) transmitted to the base station from the relay station is preferably set to undergo an MCS having a lower transmission rate than the scheduling information (S1305) of FIG. 13.

Alternatively, the relay station may transmit the scheduling information to the base station at the same time while transmitting an ACK message with respect to the data received from the base station.

Figure 15:
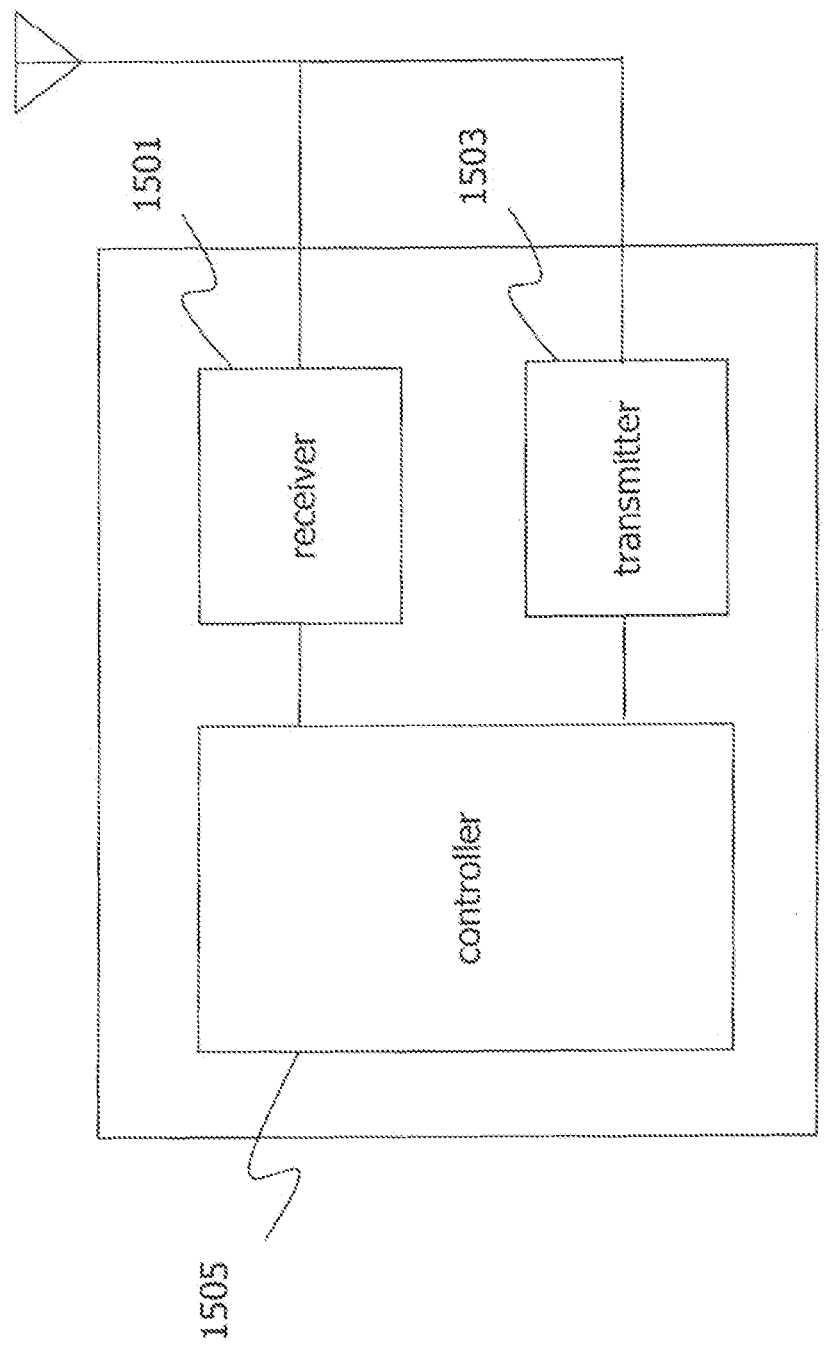
FIG. 15 is a block diagram schematically illustrating a configuration of an apparatus for cooperatively transmitting a downlink signal according to one embodiment of the present invention.

FIG. 15 is a block diagram schematically illustrating a configuration of an apparatus for cooperatively transmitting a downlink signal according to one embodiment of the present invention.

The apparatus for cooperatively transmitting a downlink signal comprises a receiver 1501, a transmitter 1503 and a controller 1505.

The receiver 1501 receives, from the base station, cooperative transmission data and scheduling information of the cooperative transmission data.

The transmitter 1503 transmits the cooperative transmission data received from the base station to the terminal.

The controller 1505 controls the receiver 1501 and the transmitter 1503, and determines whether an error has occurred in reception of the cooperative transmission data or the scheduling information. If an error has occurred in reception of the cooperative transmission data, the cooperative transmission data may be re-processed to be generated as corrected cooperative transmission data.

Preferably, the controller 1505 generates the corrected cooperative transmission data through a simplified amplifying process having no decoding process with respect to the cooperative transmission data received from the base station, or through limited decoding procedures by a reconfiguration of a reference signal.

In addition, the above various embodiments may be implemented by using, computer software, hardware, or some combination thereof. For instance, the method of the present invention may be stored in a storage medium (e.g., internal memory, flash memory, hard disc, etc.), or may be implemented in codes or commands inside a software program that can be executed by a processor such as a microprocessor inside a UE.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for cooperatively transmitting a downlink between a base station and a relay station, the method comprising:
   receiving, from the base station, cooperative transmission data and scheduling information for a cooperative transmission of the cooperative transmission data;
   transmitting, to the base station, an acknowledgement message with respect to the cooperative transmission data or the scheduling information; and
   transmitting the cooperative transmission data to a terminal with reference to the scheduling information,
   wherein a NACK message with respect to the cooperative transmission data is transmitted to the base station when an error occurs while receiving the cooperative transmission data transmitted from the base station, and the cooperative transmission data having the reception error is re-processed and the corrected cooperation transmission data is transmitted to the terminal,
   wherein the cooperative transmission data is re-processed based on a specific probability sequence,
   wherein the specific probability sequence indicates probability information of each code bit which comprises a code packet,
   wherein the code packet is generated by encoding an information packet into an MCS (Modulation and Coding Scheme) corresponding to a section between the relay station and the terminal, and
   wherein the information packet is generated based on the cooperative transmission data having the error.

2. The method of claim 1, wherein the cooperative transmission data and the scheduling information are transmitted from the base station with different levels of a Modulation and Coding Scheme (MCS).

3. The method of claim 1, wherein the cooperative transmission data and the scheduling information are transmitted from the base station through different channels.

4. The method of claim 1, wherein the scheduling information comprises at least positions of a subframe index and a resource block where the cooperative transmission is performed, a precoding scheme for the cooperative transmission, modulation and coding scheme (MCS) information for the cooperative transmission, or a type of a reference signal used for the cooperative transmission.

5. The method of claim 1, wherein a message indicating that the cooperative transmission data transmitted to the terminal is the corrected cooperative transmission data is transmitted together with the corrected cooperative transmission data.

6. The method of claim 1, further comprising transmitting the NACK message to the base station and receiving the scheduling information again from the base station upon the occurrence of an error when receiving the scheduling information transmitted from the base station.

7. An apparatus for cooperatively transmitting a downlink between a base station and a relay station in a broadband wireless communications system, the apparatus comprising:
   a receiver configured to receive, from the base station, cooperative transmission data and scheduling information of the cooperative transmission data;
   a transmitter configured to transmit the received cooperative transmission data to a terminal; and
   a controller configured to determine whether an error has occurred in reception of the cooperative transmission data or the scheduling information, and to re-process the cooperative transmission data based on a specific probability sequence when an error has occurred in reception of the cooperative transmission data, wherein the specific probability sequence indicates probability information of each code bit which comprises a code packet, wherein the code packet is generated by encoding an information packet into an MCS (Modulation and Coding Scheme) corresponding to a section between the relay station and the terminal, and wherein the information packet is generated based on the cooperative transmission data having the error.

\* \* \* \* \*